United States Patent [19]

Snyder et al.

[11] Patent Number: 4,469,119

[45] Date of Patent: Sep. 4, 1984

[54] PILOT VALVE WITH FUSIBLE LOCKOUT KNOB

[75] Inventors: David E. Snyder, Longview; Don Hiller, Midland, both of Tex.

[73] Assignee: Axelson, Inc., Longview, Tex.

[21] Appl. No.: 363,000

[22] Filed: Mar. 29, 1982

[51] Int. Cl.³ .............................................. F16K 13/04
[52] U.S. Cl. ........................................ 137/72; 137/77;
137/553; 137/625.66; 251/109
[58] Field of Search .................... 137/72, 73, 79, 80,
137/75, 77, 625.66, 553; 251/109

[56] References Cited

U.S. PATENT DOCUMENTS

| | | | |
|---|---|---|---|
| 1,251,489 | 1/1918 | Essen | 137/75 |
| 1,891,183 | 12/1932 | Aowley | 137/72 X |
| 3,015,337 | 1/1962 | Hookway | 137/553 X |
| 4,355,658 | 10/1982 | Snyder | 137/553 X |

Primary Examiner—Harold W. Weakley
Attorney, Agent, or Firm—Hubbard, Thurman, Turner & Tucker

[57] ABSTRACT

There is disclosed an apparatus for manually locking a pilot valve in an "in service" position independent of an actuating, or pilot fluid pressure. The apparatus may be either manually disengaged or will be automatically disengaged whenever the ambient temperature exceeds a predetermined level. The device includes a valve manipulating knob attached to the exterior end of a valving element for manually shifting the element from a normally closed position to the in service position. The knob includes an "L" shaped locking member which conforms to the contour of the knob, and is adapted to pivot towards the valve body and lock the valving element out in the "in service" position. This pivotal member includes an indicating surface visible from the front when the valving element is locked in an "in service" position. The locking member is comprised of a fusible material selected to yield at a predetermined temperature so as to return the valve to an operating mode responsive to the pilot fluid pressure.

3 Claims, 2 Drawing Figures

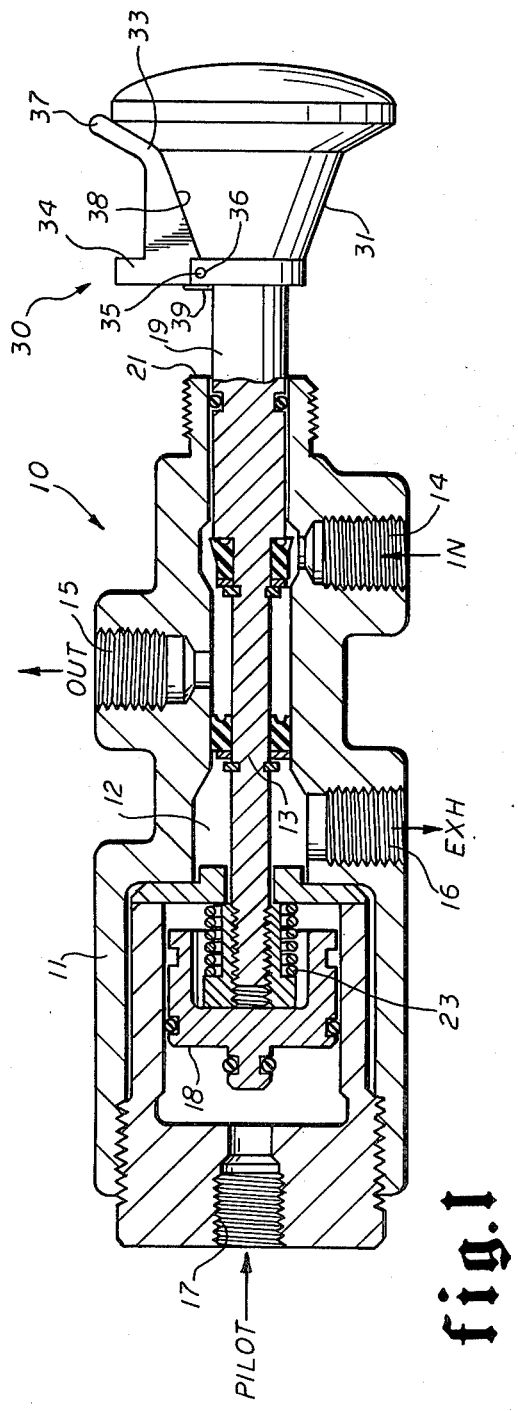
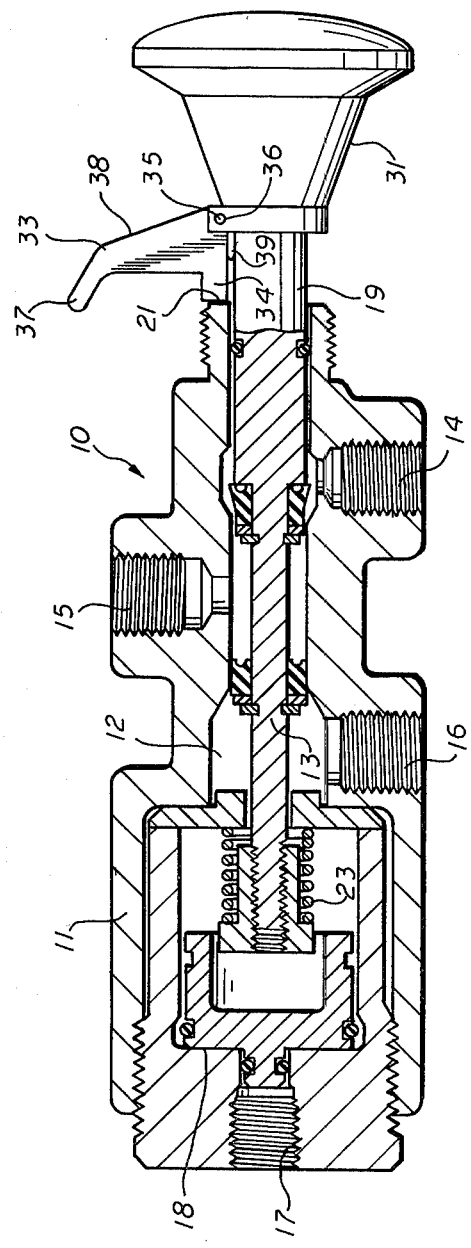

PILOT VALVE WITH FUSIBLE LOCKOUT KNOB

FIELD OF THE INVENTION

This invention relates generally to an apparatus for locking a pilot valve in the in service position. Specifically, the invention relates to a locking apparatus which may either be manually disengaged or will be automatically disengaged when exposed to environmental temperatures exceeding a predetermined level.

BACKGROUND OF THE INVENTION

Pilot control valves for use in controlling the application of a control fluid to a controlled valve are old in the art. There are numerous variations of valving element configurations designed to be responsive to pressures, springs or combinations thereof. Also old in the art are variations in valving element pressure areas (i.e., stepped pressure areas) for controlling the pilot valve in a certain manner in response to changes in actuating pressure (pilot pressure). Some pilot valve include external valving element handles for manually shifting the element to control the fluid flow therethrough. Additionally, certain pilot valves of this nature have included a means for locking the pilot valve in the in-service position, independent of pilot pressure, when such pilot pressure is below a predetermined amount. A previous application, Ser. No. 922,066, filed July 5, 1978 and now abandoned, and Snyder U.S. Pat. No. 4,355,658 to the same subject matter, describe one possible design.

However, existing locking apparatus designs exhibit certain deficiencies. For instance, pilot valves are frequently used in the petroleum, petrochemical, or other industries to control the passage of flammable or explosive fluids. In the event of an emergency, such as a fire, the lockout apparatus would remain engaged, thereby inadvertently preventing or alternatively allowing fluid to continue to flow, possibly creating or contributing to potentially severe consequences.

Thus, it becomes desirable to provide a pilot valve locking apparatus that may be disengaged manually, but also automatically disengages in response to certain changes either in pilot fluid pressure or to an elevated temperature as would be experienced in case of a fire.

SUMMARY OF THE INVENTION

An apparatus is provided for locking the valving element of a pilot valve in its "in-service" position, allowing the flow of control fluid therethrough independent of pilot fluid pressure, so long as such pilot fluid pressure is below a predetermined amount. The locking apparatus is formed, at least in part, of a fusible material which is easily deformed or melted at elevated temperatures. Thus, by yielding at a predetermined temperature, the locking apparatus allows the pilot valve to return to a "normal" position, responsive to the level of pilot fluid pressure.

The apparatus is to be used in conjunction with a typical two position pilot control valve responsive to a pilot pressure. The locking apparatus includes a generally "L" shaped locking member that may be pivoted rearwardly when the valving element is pulled out using its knob. A first leg of the locking member is pivoted rearwardly to engage the front surface of the pilot valve body to retain the valving element in its "inservice" position.

The locking member includes a second leg that stands vertically when a locking member is locked into position, such second leg having a forward facing surface for indicating the position of the locking member. Also included is a spring attached to the knob for biasing the locking member forward into its disengaged position adjacent the knob.

It is therefore a principal feature and advantage of the invention to provide a heat sensitive lockout device which will permit the pilot valve to return to its normal state when exposed to ambient temperatures above a predetermined level.

BRIEF DESCRIPTION OF THE DRAWINGS

FIG. 1 is a vertical sectional view of the pilot valve shown in its "in-service" position held by pilot pressure.

FIG. 2 is a vertical sectional view of the pilot valve shown in its "in-service" position held by the lock-out device.

DETAILED DESCRIPTION OF THE INVENTION

Turning now to the drawings, a typical pilot valve is shown generally and illustrated at 10. It includes a body 11 having an internal bore 12. Within this bore 12 is a valving element 13, which serves to control the flow of a control fluid therethrough. The valve 10 is so designed to permit flow between an outlet port 15 and an inlet port 14 when the element 13 is in its "in service" position (FIG. 1) and to permit flow between the outlet port and an exhaust port 16 when the element is shifted to the left to its "normal" position. In this manner, with the pilot valve 10 "in service", a control fluid at the inlet port 14 flows to the outlet port 15 and thus to the operating mechanism of a control valve, such as a motor valve (not shown). Shifting the element 13 to the "normal" position interrupts communication between the inlet and outlet ports 14 and 15 and provides communication between the outlet and exhaust ports 15 and 16, releasing the control fluid pressure in the control valve to atmosphere, and allowing the control valve to shift position in response to a self-contained spring or the like.

The action of the pilot valve 10, is controlled by opposing forces of the pilot fluid pressure acting on a piston surface 18 of the valving element at 13 and that of an internal first resilient means, or spring 23. In the valve shown, pilot pressure at port 17 will retain the valving element 13 in its "in service" position as shown in FIG. 1, allowing the control fluid to pass through the valve 10, thereby controlling the operation of a motor valve or other control valve. A decrease in this pilot pressure to a predetermined minimum amount permits the element 13 to shift in response to the force of the internal spring 23 to an exhaust or "normal" position, allowing the motor valve control fluid to exhaust through the pilot valve outlet port 15 and exhaust port 16 and be released to the atmosphere.

Connected to the exterior shaft portion 19 of the valving element 13 is a pilot by-pass locking and indicating means generally illustrated at 30. This means 30 comprises a valve element knob 31 which provides a means whereby the valving element 13 may be manually shifted from a "normal" position to an "in service" position.

The pilot by pass locking and indicating means 30 further includes a generally "L" shaped locking and indicating member 33 for locking the valving element 13 in "in service" position, against the force of spring 23. This locking member 33 comprises a first leg 34 pivotally connected at one end to the knob 31 so that the first leg 34 may rotate freely from a vertical position, generally perpendicular to the axis of the element 13 to a position in which the first leg is parallel and adjacent to the axis of the element 13 so as to engage the surface 21 of the valve body 11 and preclude the spring 23 from urging the element 13 to its normal position. The locking member 33 pivots through approximately 90° by means of a pair of pivot pins 35 rotatably set into mating pivot slots 36 of the valve element knob 31.

The locking member 33 has a second leg 37 positioned normal to the first leg 34 and connected thereto at the pivotal connection to the knob 31. This second leg 37 includes an indicator surface 38 which is clearly visible from a point in front of the knob 31 when the member 33 is in a vertically locked position, as shown in FIG. 2. This surface 38 may be a bright, contrasting color in order to be more easily visible and distinguishable from the knob and valve body. A second resilient means, or spring 39, is mounted between the knob 31 and locking member 33, so as to urge the locking member into an unengaged position, as to allow the valving element 13 unrestricted movement between its "normal" and in service" position.

The locking member 33 is formed, at least in part, of a fusible material. That is, a material that will melt, deform, or disintegrate in the presence of a predetermined temperature, such as will be generated by a fire of explosion.

As was indicated, it is not necessary that the entire locking member 33 be formed of the fusible material. Specifically, only the first leg 34 is structurally significant in retaining the pilot valve 13 in a "in service" position.

Once the first leg 34 has been sufficiently softened, the force exerted by spring 23 will overcome the resistance of locking member 33 and return the pilot valve 13 to an "normal" position. Alternatively, the locking member 33 may be designed so as to disengage under the influence of the second resilient means, or spring 39 upon the reduction of the frictional contact between the first leg 34 and the front surface 21 due to the melting of the fusible material.

In order to facilitate the construction of the locking member, it is desirable and economically advantageous to select a fusible material which is not only responsive to the proper temperature, but which is readily molded and manufactured. In the preferred embodiment of the invention, the fusible material may be a thermoplastic material which exhibits the above discussed characteristics. Specifically, Acetal resin, marketed under the name "Delrin" has been found to advantageously lend itself to utilization in the present invention.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the present invention without departing from the scope thereof. It is to be understood that all matter herein set forth are shown in the accompanying drawings is to be interpreted as illustrative and not in a limiting sense.

For instance, the operation of a pilot valve 10 may be reversed, so that the locking element 33, when engaged, will maintain the pilot valve in an "exhaust" position. This embodiment of this invention may be applicable to an automatic sprinkling system, whereby a fire will melt the locking element allowing the pilot valve to open, and ultimately activate the sprinklers.

The invention having been described, what is claimed is:

1. In a pilot valve for controlling a supply of control fluid to a controlled valve, having a body, an inlet port, an outlet port, an exhaust port, a pilot port, a valving element responsive to a pilot pressure shiftable between an in service position allowing communication between the inlet and outlet port and a normal position allowing communication between the outlet and exhaust ports, said valving element having a shift portion, said shaft portion defining a first end within the interior of the valve body and a second end extending exteriorly of the valve body, and a first resilient means for biasing the valving element towards the normal position, the improvement comprising a pilot by pass locking and indicating means comprising:

(a) a valve knob connected to the second end of the valving element for manually shifting the element from its normal to its in service position;

(b) a generally "L" shaped locking and indicating member, said member being constructed entirely of a fusible material, said member being pivotally connected to said knob and having a first leg adapted to frictionally engage a surface of the valve body so as to lock the valving element in its in service position, a second leg having an indicating surface thereon for indicating the locked in service position, said locking member being rotatable between a first position in which said first leg extends towards and frictionally engages the surface of the valve body to lock the valving element in its in service position against the action of the first resilient means and in which said second leg extends away from the shaft portion to position said indicating surface visibly above said knob, and a second position in which said locking member has said first leg disengaged from the surface of the valve body and said second leg extending along and adjacent to said knob to conceal said indicating surface from view; and (c) a second resilient means carried by said knob and one of said leg portions and engaging said locking member for biasing said locking member away from said first position towards said second position so that said locking member is retained in the first position against the action of said second resilient means by the frictional engagement of the first leg with the surface of the valve body and so that said second resilient means moves said locking member from said first position toward said second position in response to a reduction of the frictional engagement caused by melting of the locking member responsive to elevated temperature, thereby unlocking the valving element.

2. The device of claim 1, wherein said fusible material comprising the "L" shaped locking member is a thermoplastic selected to deform at a predetermined temperature.

3. The device of claim 2, wherein the thermoplastic material is Acetel.

* * * * *